US011715216B2

(12) United States Patent
Song et al.

(10) Patent No.: US 11,715,216 B2
(45) Date of Patent: Aug. 1, 2023

(54) METHOD AND APPARATUS WITH OBJECT TRACKING

(71) Applicant: SAMSUNG ELECTRONICS CO., LTD., Suwon-si (KR)

(72) Inventors: Ju Hwan Song, Suwon-si (KR); Hyunjeong Lee, Seoul (KR); Changbeom Park, Seoul (KR); Changyong Son, Anyang-si (KR); Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 17/404,413

(22) Filed: Aug. 17, 2021

(65) Prior Publication Data
US 2022/0309686 A1  Sep. 29, 2022

(30) Foreign Application Priority Data
Mar. 25, 2021 (KR) ........................ 10-2021-0038841

(51) Int. Cl.
*G06V 10/44* (2022.01)
*G06V 10/22* (2022.01)
*G06T 7/246* (2017.01)

(52) U.S. Cl.
CPC .............. *G06T 7/248* (2017.01); *G06V 10/22* (2022.01); *G06V 10/44* (2022.01); *G06T 2207/20216* (2013.01)

(58) Field of Classification Search
None
See application file for complete search history.

(56) References Cited

U.S. PATENT DOCUMENTS

| 10,275,709 B2 | 4/2019 | Munteanu et al. |
| 2020/0050202 A1* | 2/2020 | Suresh ................. G06V 10/955 |
| 2020/0364885 A1* | 11/2020 | Latapie .................. G06N 20/00 |

FOREIGN PATENT DOCUMENTS

| CN | 107122741 B | 6/2020 |
| CN | 109493367 B | 10/2020 |
| JP | 4578864 B2 | 11/2010 |
| KR | 10-0696725 B1 | 3/2007 |
| KR | 10-2017-0075444 A | 7/2017 |

OTHER PUBLICATIONS

Zhang, Jianming, et al. "Spatially attentive visual tracking using multi-model adaptive response fusion." *IEEE Access* vol. 7 (Jul. 12, 2019): pp. 83873-83887.

(Continued)

*Primary Examiner* — Idowu O Osifade
(74) *Attorney, Agent, or Firm* — NSIP Law

(57) ABSTRACT

A processor-implemented object tracking method includes: setting a suppressed region in a template image based on a shape of a target box of the template image; refining a template feature map of the template image by suppressing an influence of feature data corresponding to the suppressed region in the template feature map; and tracking an object by determining a bounding box corresponding to the target box in a search image based on the refined template feature map.

26 Claims, 12 Drawing Sheets

(56) References Cited

OTHER PUBLICATIONS

Kwan, Chiman, et al. "Compressive vehicle tracking using deep learning." *2018 9th IEEE Annual Ubiquitous Computing, Electronics & Mobile Communication Conference (UEMCON)*. IEEE, Nov. 8-10, 2018. pp. 51-56.
Lei, et al. "Local Perception based Auxiliary Neural Network for Object Tracking." *2021 the 5th International Conference on Innovation in Artificial Intelligence*. Mar. 2021. pp. 127-132.
Extended European Search Report dated Apr. 20, 2022 in counterpart European Patent Application No. 21207318.3. (10 pages in English).

* cited by examiner

METHOD AND APPARATUS WITH OBJECT TRACKING

CROSS-REFERENCE TO RELATED APPLICATIONS

This application claims the benefit under 35 USC § 119(a) of Korean Patent Application No. 10-2021-0038841 filed on Mar. 25, 2021, in the Korean Intellectual Property Office, the entire disclosure of which is incorporated herein by reference for all purposes.

BACKGROUND

1. Field

The following description relates to an object tracking method and apparatus.

2. Description of Related Art

Technological automation of processes such as recognition (for example, pattern recognition) may be implemented through processor-implemented neural network models, as specialized computational architectures which, after substantial training, may provide computationally intuitive mappings between input patterns and output patterns. The trained capability of generating such mappings may be referred to as a learning capability of a neural network. Further, because of the specialized training, such a specially trained neural network may thereby have a generalization capability of generating a relatively accurate output with respect to an input pattern that the neural network may not have been trained for, for example.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a processor-implemented object tracking method includes: setting a suppressed region in a template image based on a shape of a target box of the template image; refining a template feature map of the template image by suppressing an influence of feature data corresponding to the suppressed region in the template feature map; and tracking an object by determining a bounding box corresponding to the target box in a search image based on the refined template feature map.

The suppressed region may correspond to an outer region in the template image.

The method may include: comparing a width and a height of the target box; and determining the shape of the target box to be either one of a first type that is long in a direction of the width and a second type that is long in a direction of the height based on a result of the comparing.

The setting of the suppressed region may include: in response to the target box being of the first type, setting the suppressed region in an outer side in the template image in the direction of the height; and in response to the target box being of the second type, setting the suppressed region in an outer side in the template image in the direction of the width.

The refining of the template feature map may include suppressing the influence of the feature data by applying, to the feature data, an average feature value that is based on the template feature map.

The method may include updating the refined template feature map based on either one or both of: a difference between the target box and the bounding box; and a confidence level of the bounding box.

The updating of the refined template feature map may include updating the refined template feature map in response to the difference being less than a first threshold and the confidence level being greater than a second threshold.

The updating of the refined template feature map may include: determining a new feature map based on a search feature map of the search image; and updating the refined template feature map by determining a weighted sum of the template feature map and the new feature map.

The determining of the new feature map may include: determining a template region corresponding to the template image in the search feature map; and determining the new feature map by suppressing an influence of feature data corresponding to the suppressed region in the template region.

The method may include: extracting the template feature map from the template image using a feature extraction model; and extracting a search feature map from the search image using the feature extraction model.

The determining of the bounding box may include determining the bounding box based on a result of comparing the refined template feature map and the search feature map.

In one general aspect, one or more embodiments include a non-transitory computer-readable storage medium storing instructions that, when executed by a processor, configure the processor to perform any one, any combination, or all operations and methods described herein.

In another general aspect, an object tracking apparatus includes: a processor configured to: set a suppressed region in a template image based on a shape of a target box of the template image; refine a template feature map of the template image by suppressing an influence of feature data corresponding to the suppressed region in the template feature map; and track an object by determining a bounding box corresponding to the target box in a search image based on the refined template feature map.

The processor may be configured to: compare a width and a height of the target box; and determine the shape of the target box to be either one of a first type that is long in a direction of the width and a second type that is long in a direction of the height based on a result of the comparing.

For the setting of the suppressed region, the processor may be configured to: in response to the target box being of the first type, set the suppressed region in an outer side in the template image in the direction of the height; and in response to the target box being of the second type, set the suppressed region in an outer side in the template image in the direction of the width.

For the refining of the template feature map, the processor may be configured to suppress the influence of the feature data by applying, to the feature data, an average feature value that is based on the template feature map.

The processor may be configured to: determine a new feature map based on a search feature map of the search image; and update the refined template feature map by obtaining a weighted sum of the template feature map and the new feature map.

For the determining of the new feature map, the processor may be configured to: determine a template region corresponding to the template image in the search feature map; and determine the new feature map by suppressing an influence of feature data corresponding to the suppressed region in the template region.

The apparatus may include a memory storing instructions that, when executed by the processor, configure the processor to perform the setting of the suppressed region, the refining of the template feature map, and the determining of the bounding box.

The apparatus may be an electronic apparatus comprising a camera configured to generate the template image and the search image.

In another general aspect, an electronic apparatus includes: a camera configured to generate either one or both of a template image and a search image; and a processor configured to set a suppressed region in the template image based on a shape of a target box of the template image, refine a template feature map of the template image by suppressing an influence of feature data corresponding to the suppressed region in the template feature map, and track an object by determining a bounding box corresponding to the target box in the search image based on the refined template feature map.

The processor may be configured to: determine the shape of the target box to be either one of a first type that is long in a direction of a width of the target box and a second type that is long in a direction of a height of the target box based on a result of comparing the width and the height; and for the setting of the suppressed region, in response to the target box being of the first type, set the suppressed region in an outer side in the template image in the direction of the height; and in response to the target box being of the second type, set the suppressed region in an outer side in the template image in the direction of the width.

In another general aspect, a processor-implemented object tracking method includes: setting a suppressed region in a template image based on a shape of a target box of the template image; replacing, in a template feature map of the template image, feature data corresponding to the suppressed region; tracking an object by determining a bounding box corresponding to the target box in a search image based on the template feature map including the replaced feature data.

The setting of the suppressed region may be based on an orientation of a length of the target box.

The replacing may include replacing the feature data with either one of: an average feature value of entire feature data of the template feature map; and an average feature value of partial feature data of the template feature map corresponding to the target box.

The template image may include a frame in successive image frames and the search image may include a subsequent frame in the successive image frames.

Other features and aspects will be apparent from the following detailed description, the drawings, and the claims.

Figure 1:
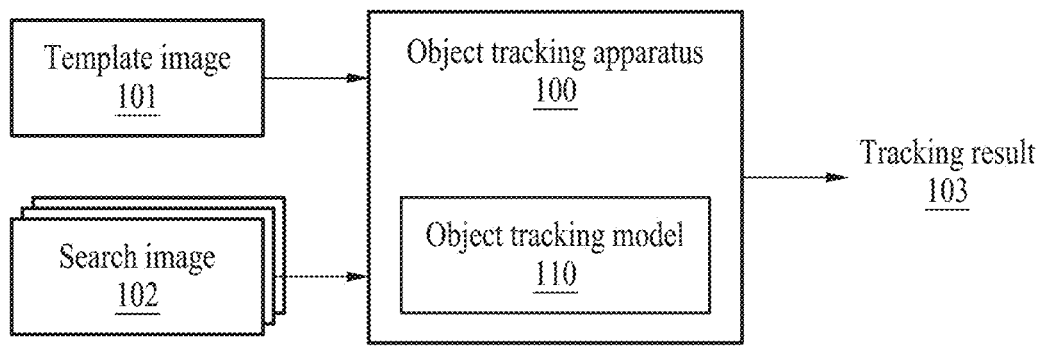
FIG. 1 illustrates an example of an overall configuration and operation of an object tracking apparatus.

Throughout the drawings and the detailed description, unless otherwise described or provided, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, detailed description of structures or functions that are thereby known after an understanding of the disclosure of the present application may be omitted when it is deemed that such description may cause ambiguous interpretation of the example embodiments. Hereinafter, examples will be described in detail with reference to the accompanying drawings, and like reference numerals in the drawings refer to like elements throughout.

FIG. 1 illustrates an example of an overall configuration and operation of an object tracking apparatus. Referring to FIG. 1, an object tracking apparatus 100 may output a tracking result 103 based on a template image 101 and a search image 102. A tracking result described herein may refer to a result of tracking an object. The template image 101 may provide information of a target object which is a target to be tracked. The object tracking apparatus 100 may track the target object in the search image 102 using the information of the target object. The information of the target object may also be referred to herein as target object information. The tracking result 103 may indicate a location of the target object in the search image 102.

In an example, the template image 101 and the search image 102 may be a series of successive image frames. In this example, the template image 101 may be one frame of a video file including a plurality of frames, and the search image 102 may be at least one frame subsequent to the frame corresponding to the template image 101. In another example, the template image 101 and the search image 102 may be files or images independent of each other. In this example, the search image 102 may be a video file including a plurality of frames, and the template image 101 may be a still image file independent of the video file. In either one of these foregoing examples, the template image 101 may include a target object, and the object tracking apparatus 100 may generate the tracking result 103 by tracking the target object in the search image 102. Each of the template image 101 and the search image 102 may correspond to an entire region of a corresponding image frame or a partial region in the corresponding image frame.

The object tracking apparatus 100 may generate the tracking result 103 using an object tracking model 110. The object tracking model 110 may be a machine learning-based artificial intelligence (AI) model. For example, the object tracking model 110 may include a deep neural network (DNN) including a plurality of layers. The layers may include an input layer, at least one hidden layer, and an output layer.

The DNN may include at least one of a fully-connected network (FCN), a convolutional neural network (CNN), or a recurrent neural network (RNN). For example, at least one portion of the layers in the neural network may correspond to a CNN, and another portion of the layers may correspond to an FCN. In this example, the CNN may include one or more convolutional layers, and the FCN may include one or more fully-connected layers.

In a case of the CNN, data input to each layer may be referred to as an input feature map, and data output from each layer may be referred to as an output feature map. The input feature map and the output feature map may be collectively referred to as activation data. For example, in a case in which the convolutional layer is the input layer, the input feature map of the input layer may be an input image. The output feature map may be generated through a convolution operation between the input feature map and a weight kernel. The input feature map, the output feature map, and the weight kernel may be distinguished by a tensor unit.

After being trained based on deep learning, the neural network may map input data and output data that are in a nonlinear relationship to perform an inference that is suitable for a purpose of training. The deep learning may be a machine learning method that is used to solve an issue such as image or speech recognition from a big dataset. The deep learning may be construed as an optimization problem-solving process for finding a point at which energy is minimized while training the neural network using prepared training data.

The deep learning may include supervised or unsupervised learning, through which an architecture of the neural network or a weight corresponding to the model may be obtained. Through the weight, the input data and the output data may be mapped to each other. When the width and depth of the neural network are sufficiently large, the neural network may have a capacity that is sufficient to implement a function. When the neural network learns a sufficiently great amount of training data through a suitable training process, an optimal performance may be achieved.

The neural network may be described herein as being trained "in advance." Such an expression may indicate "before" the neural network begins. That the neural network begins may indicate that the neural network is ready for an inference. For example, that the neural network begins may include a state in which the neural network is loaded into a memory or input data for an inference is input to the neural network after the neural network is loaded into the memory.

The object tracking apparatus 100 may input the template image 101 and the search image 102 to the object tracking model 110, and obtain the tracking result 103 from an output of the object tracking model 110. The object tracking model 110 may be trained in advance to output the tracking result 103 in response to the template image 101 and the search image 102 being input.

A size of an input which the object tracking model 110 is configured to process may be fixed, and the fixed input size may not be sufficient for object tracking that tracks various target objects of various shapes. For example, the input of the object tracking model 110 may be dimensionally square or nearly square. In this example, accuracy in tracking a target object of a long shape may be degraded. The template image 101 may include context information corresponding to a background, in addition to target object information. For example, when a square target box is applied to a target object of a long shape, context information may account for an extremely high proportion in a template. In this example, the object tracking apparatus 100 may refine the template to be suitable or conform to the shape of the target object and may thus prevent performance degradation that may occur due to the shape of the target object.

In addition, the target object of the template image 101 may be in a deformed shape in the search image 102. For example, in a case in which the target object is a track and field athlete, the athlete may be shown in various shapes in the search image 102 based on a pose of the athlete. The object tracking apparatus 100 may update the template image 101 based on a change in the target object. In an example, the object tracking apparatus 100 may maintain the stability of object tracking through an update based on a threshold and/or weighted operation associated with the change in the target object. In an example, the object tracking apparatus 100 may maximize an object tracking performance by applying a template refinement to a new template for the template update.

Figure 2:
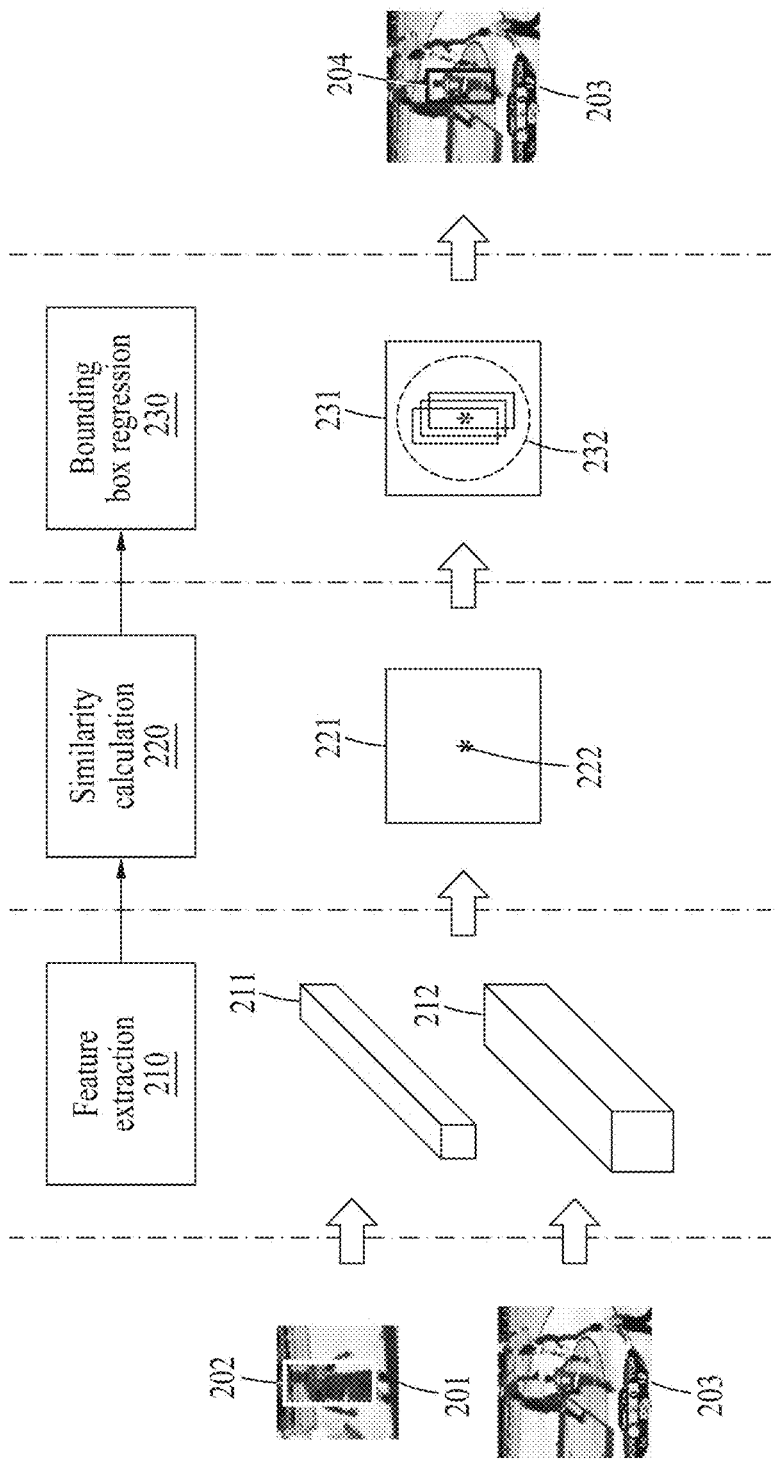
FIG. 2 illustrates an example of a detailed operation of an object tracking apparatus.

FIG. 2 illustrates an example of a detailed operation of an object tracking apparatus (e.g., the object tracking apparatus 100 of FIG. 1). Referring to FIG. 2, an object tracking apparatus may perform object tracking through feature extraction 210, similarity calculation 220, and bounding box regression 230. At least one of the feature extraction 210, the similarity calculation 220, or the bounding box regression 230 may be performed using an object tracking model. For example, the object tracking model may include at least one of a feature extraction network for the feature extraction 210, a similarity calculation network for the similarity calculation 220, or a bounding box regression network for the bounding box regression 230. Each of the feature extraction network, the similarity calculation network, and the bounding box regression network may be a neural network. The object tracking model may include a siamese network, for example.

In the feature extraction 210, the object tracking apparatus may extract a template feature map 211 from a template image 201, and extract a search feature map 212 from a search image 203. The object tracking apparatus may extract the target feature map 211 and the search feature map 212 using the object tracking model and/or the feature extraction model that shares a parameter. In the example of FIG. 2, the template image 201 may correspond to a region in a frame (hereinafter, an nth frame) of a video, and the search image 203 may correspond to a region in a subsequent frame (hereinafter, an n+1th frame) of the frame.

When a target object is detected in the nth frame, a target box 202 corresponding to the target object may be set in the nth frame. The target box 202 may be a type of a bounding box, and may be specified based on box location information (e.g., x and y coordinates) and box size information (e.g., a width and a height) of the target box 202. The template image 201 may be determined based on a location and a size (e.g., the box location information and box size information) of the target box 202. The search image 203 may be determined based on the template image 201. For example, the search image 203 may be determined in the n+1th frame based on the location and the size of the template image 201 in the nth frame. The size of the search image 203 may be determined to be greater than that of the template image 201. The template image 201 may include target object information and context information. The target object information may be included inside the target box 202 and the context information may be included outside the target box 202 (and/or an inside of the target box 202 may be used to determine the target object information and an outside of the target box 202 may be used to determine the context information, for example). The target feature map 211 may include the target object information and the context information.

In the similarity calculation 220, the object tracking apparatus may calculate a similarity by comparing the template feature map 211 and the search feature map 212. The similarity calculation 220 may be performed through the similarity calculation network. The similarity calculation network may derive a cross-correlation between the template feature map 211 and the search feature map 212 through a cross-correlation layer. A result of the calculating may indicate a location in the search image 203 corresponding to the target object information and/or the template feature map 211. For example, the result of the calculating may indicate a corresponding location 222 in a search space 221 corresponding to the search image 203 and/or a score of the corresponding location 222. The location 222 may correspond to a location of the target object in the search image 203, for example.

In the bounding box regression 230, the object tracking apparatus may perform a regression analysis using bounding boxes 232 at the corresponding location 222 in the search space 231 (e.g., the search space 221) corresponding to the search image 203. Through the regression analysis, the object tracking apparatus may detect a bounding box 204 corresponding to the target box 202 in the search image 203, and generate a tracking result based on location information of the bounding box 204.

Figure 3:
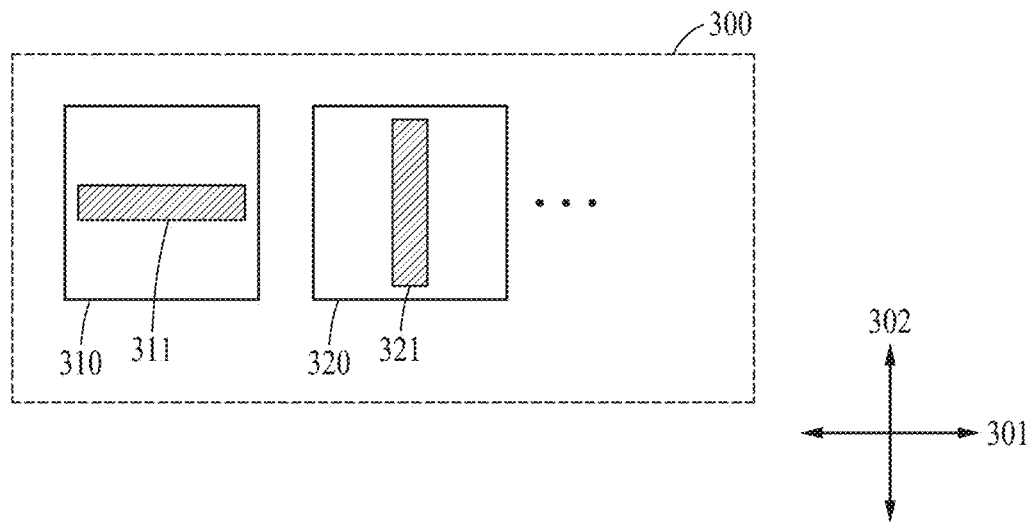
FIG. 3 illustrates example unbalanced templates.

FIG. 3 illustrates example unbalanced templates. As described above, a template image may include target object information and context information. The context information may provide information associated with a nearby environment of a target object, contributing to tracking the target object. However, in a case in which the context information accounts for an extremely large proportion in the template image, a tracking performance may be degraded. Thus, an object tracking apparatus of one or more embodiments may improve the tracking performance by performing a balance between the target object information and the context information of the template image.

Referring to FIG. 3, unbalanced template images 300 may include a first template image 310 including a first target box 311 of a first type and a second template image 320 including a second target box 321 of a second type. The first target box 311 may have a bar shape elongated in a width direction 301. The second target box 321 may have a bar shape elongated in a height direction 302. The bar shape may refer to a shape in which a difference between a width and a height is greater than a preset threshold. For example, a threshold range may be set based on a ratio (width:height) between a width and height of a box, for example, 1:2 or 2:1, and a shape that deviates the threshold range may be defined as the bar shape.

The object tracking network may use an input of a fixed size. For example, a network input may be in a square shape based on a width and height of a target box irrespective of a shape of a target object. A length of one side of a quadrangle may be calculated as "$((w\_z*h\_z)^2)^{(1/2)}$", in which w_z may be "box width+(½)*(box width+box height)", and h_z may be "box height+(½)*(box width+box height)". Thus, a template image including a target box of such a bar shape may include context information at an extremely high proportion. Although the template images 310 and 320 respectively including the target boxes 311 and 321 of the bar shape are illustrated as examples of the unbalanced template images 300, the unbalanced template images 300 may include other types of template images having an imbalance between target object information and context information. The object tracking apparatus of one or more embodiments may derive information balance in the unbalanced template images 300, thereby improving a tracking performance. In an example, the object tracking apparatus may obtain the information balance by setting a region corresponding to excessive information as a suppressed region. In this example, the object tracking apparatus may obtain the information balance by suppressing a region that provides the context information in the template images 310 and 320.

Figure 4:
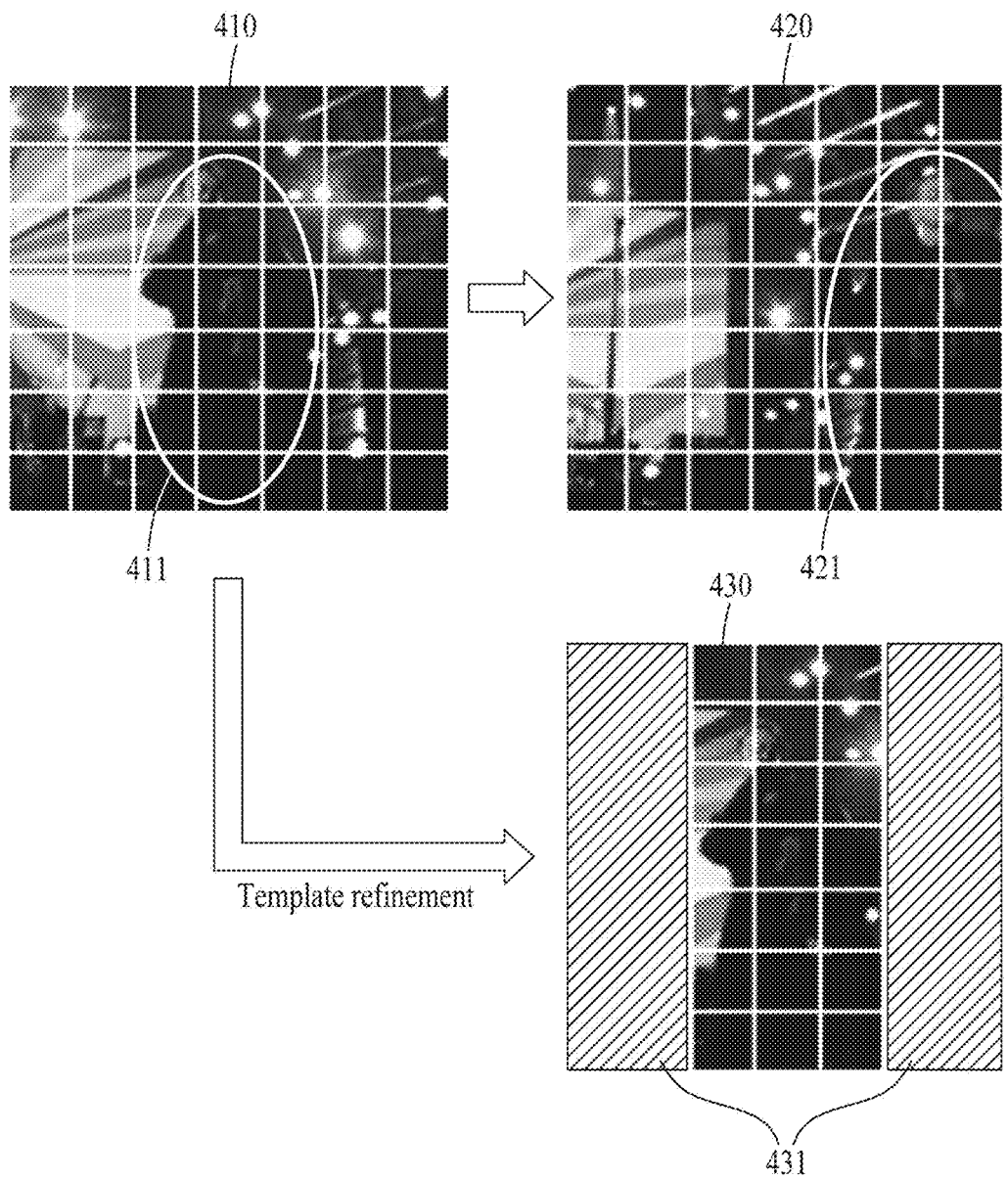
FIGS. 4 and 5 illustrate examples of tracking results from unbalanced templates and results of a template refinement.
Figure 5:
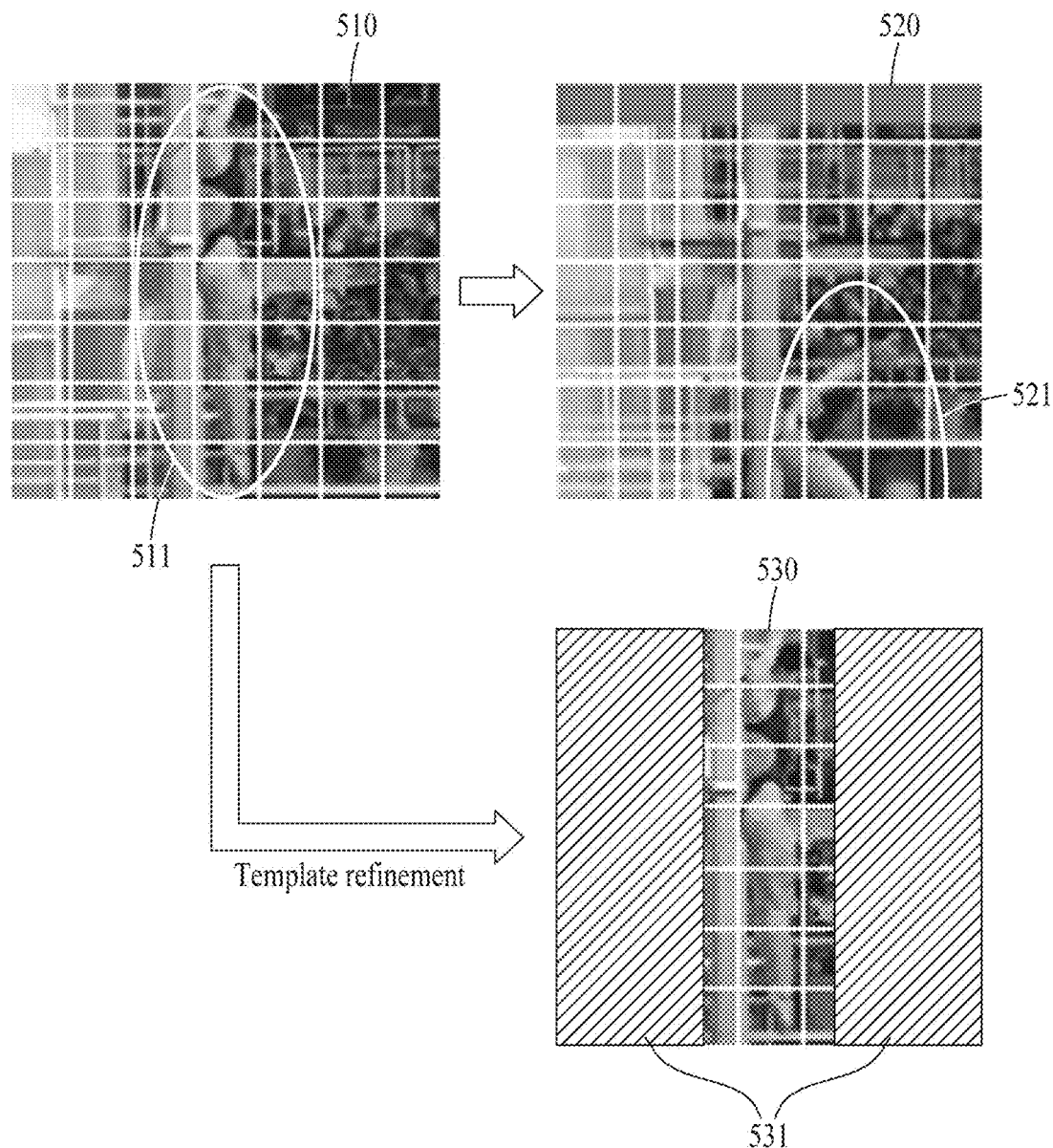

FIGS. 4 and 5 illustrate examples of tracking results from bar-shaped target boxes and results of a template refinement therefrom. Referring to FIGS. 4 and 5, target objects 411 and 511 may correspond to a bar shape, and thus template images 410 and 510 may include excessive context information. Thus, target objects 421 and 521 may gradually deviate respectively from corresponding regions 420 and 520 in subsequent frames, which may result in a degrading tracking performance. The corresponding regions 420 and 520 may be portions respectively corresponding to the template images 410 and 510 in respective search regions of search images. An object tracking apparatus (e.g., the object tracking apparatus 100 of FIG. 1) may refine the template images 410 and 510 by respectively setting suppressed regions 431 and 531 in the respective template images 410 and 510. For example, the object tracking apparatus may suppress an influence of feature data corresponding to the suppressed regions 431 and 531 in template feature maps. Through the refining, refined template images 430 and 530, that may include target object information and context information at a suitable ratio therebetween, may be obtained and may thus prevent the degradation of the tracking performance.

Figure 6:
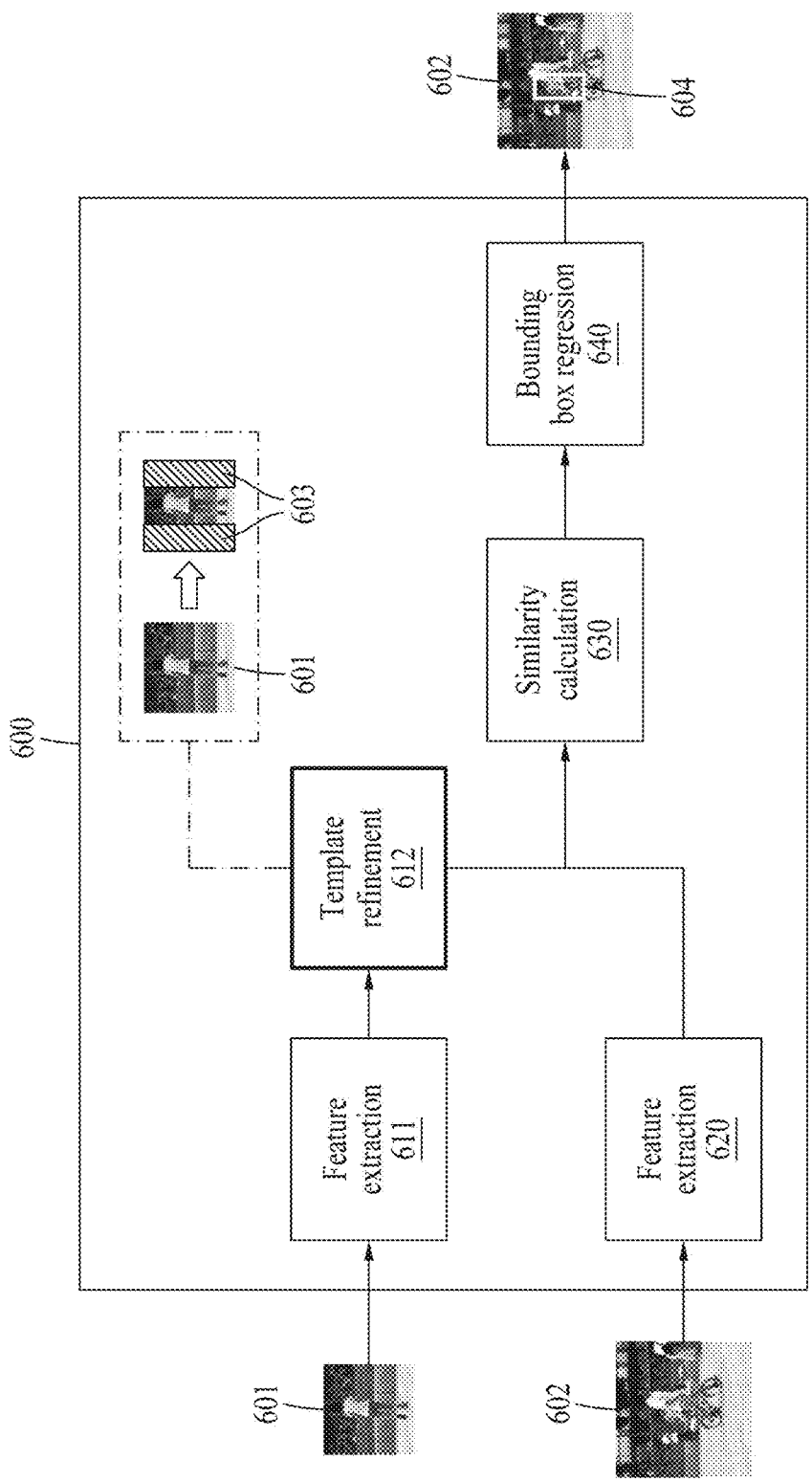
FIG. 6 illustrates an example of object tracking based on a template refinement.

FIG. 6 illustrates an example of object tracking based on a template refinement. Referring to FIG. 6, an object tracking operation 600 may include feature extraction 611 and 620, template refinement 612, similarity calculation 630, and bounding box regression 640. An object tracking apparatus (e.g., the object tracking apparatus 100 of FIG. 1) may extract a template feature map from a template image 601 and extract a search feature map from a search image 602, using a feature extraction model. The object tracking apparatus may perform the template refinement 612 on the template image 601 and/or the template feature map. For example, the object tracking apparatus may perform the template refinement 612 by setting a suppressed region 603 in the template image 601 based on a shape of a target box of the template image 601, and suppressing an influence of feature data corresponding to the suppressed region 603 in the template feature map (e.g., suppressing an influence of the feature data for the similarity calculation 630).

The suppressed region 603 may correspond to an outer region in the template image 601. An outer region in a template image described herein may refer to an edge region in the template image (e.g., where the edge region is a region disposed outside a target box in the template image). The object tracking apparatus may compare a width and a height of the target box, and determine a shape of the target box to be a first type long in a width direction or a second type long in a height direction based on a result of the comparing. In the example of FIG. 6, the target box of the template image 601 may correspond to the second type. For example, when the target box corresponds to the first type, the object tracking apparatus may set a first suppressed region in an outer region in the height direction of the template image 601, and the first suppressed region may be set to be long in the width direction in a vertical outer region in the template image 601. In contrast, when the target box corresponds to the second type, the object tracking apparatus may set a second suppressed region in an outer region in the width direction of the template image 601, and the second suppressed region may be set to be long in the height direction in a horizontal outer region in the template image 601. In the example of FIG. 6, the suppressed region 603 may correspond to the second suppressed region.

The object tracking apparatus may suppress an influence of feature data corresponding to the suppressed region 603 by applying, to the feature data, an average feature value that is based on the template feature map. For example, the object tracking apparatus may replace the feature data corresponding to the suppressed region 603 with an average feature value of entire feature data of the template feature map or an average feature value of partial feature data of the template feature map corresponding to the target box. The object tracking apparatus may determine a bounding box 604 in the search image 602 based on a result of comparing the refined template feature map and the search feature map. The template refinement 612 may suppress the influence of the feature data corresponding to the suppressed region 603, and thus the similarity calculation 630 may be performed based on a target object.

Figure 7:
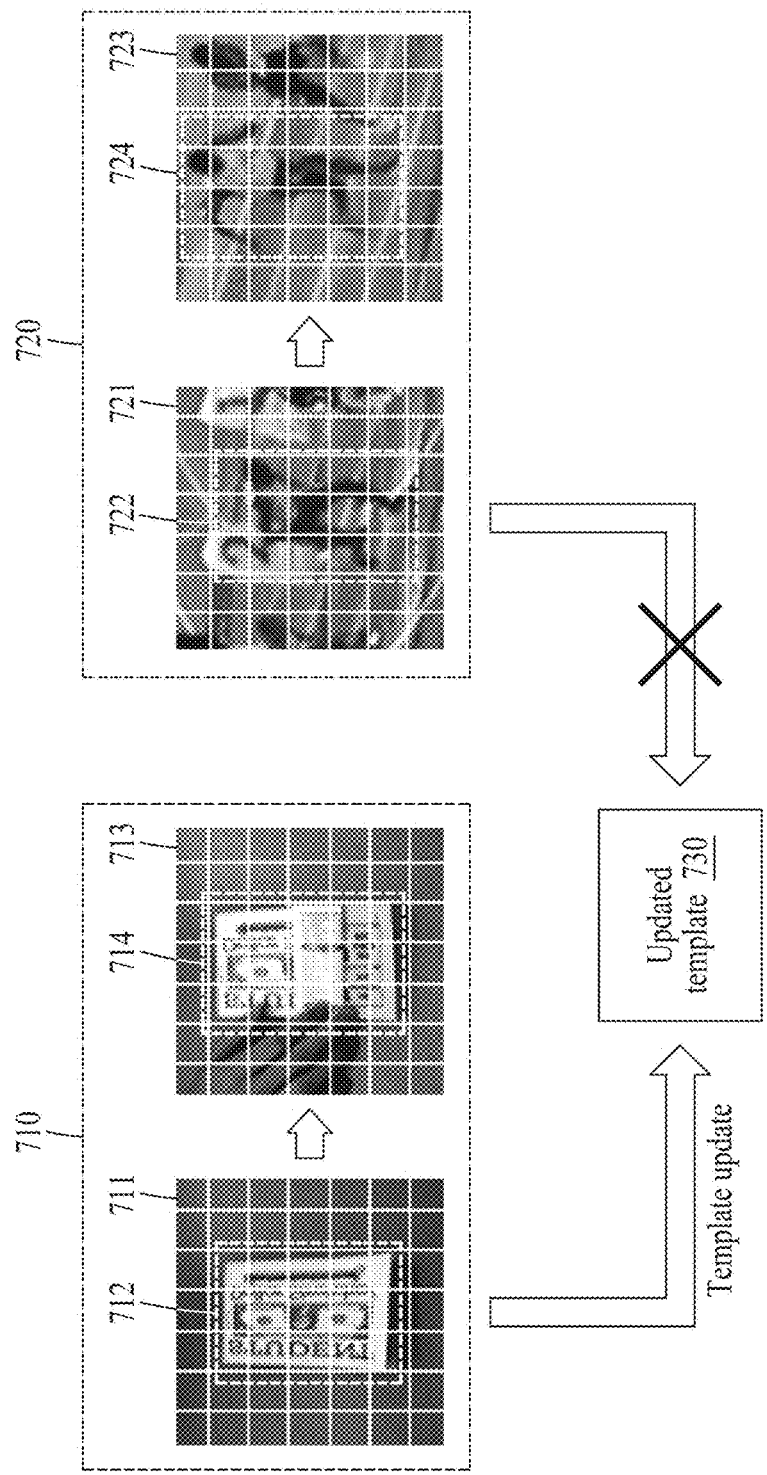
FIG. 7 illustrates an example of a template update.

FIG. 7 illustrates an example of a template update. As described above, a shape of a target object in a search image may be deformed variously. For example, as illustrated, a shape of a target object in a target box 712 of a first template image 711 of a first image frame set 710 may be deformed as shown in a bounding box 714 of a first search image 713 of the first image frame set 710. The target object of the first image frame set 710 may be a booklet, and a page of the booklet may be folded in the first search image 713. A shape of a target object in a target box 722 of a second template image 721 of a second image frame set 720 may be deformed as shown in a bounding box 724 of a second search image 723 of the second image frame set 720. The target object of the second image frame set 720 may be an athlete, and a pose of the athlete may be changed in the second search image 723 (e.g., the pose may change from the second template image 721 to the second search image 723).

In an example, an object tracking apparatus may update a template based on a change in a target object. The object tracking apparatus may update the template based on an update condition. The update condition may be set for at least one of an elapsed time, a difference between a target box (e.g., the target box 712 or 722) and a bounding box (e.g., the bounding box 714 or 724), or a confidence level of the bounding box 714 or 724. Although the template update may increase a tracking performance, an excessive template change may rather degrade a tracking stability. Accordingly, the object tracking apparatus of one or more embodiments may increase the tracking performance while maintaining the tracking stability through an update based on the update condition set to respond to a small change and/or on a weighted operation.

For example, a threshold of the elapsed time may be set, and the update condition may be satisfied when the elapsed time is less than the threshold. In this example, as the elapsed time increases, the shape of the target object may change greatly. The elapsed time may refer to a time that elapses as object tracking is performed.

Also, a threshold of the difference between the target box 712 or 722 and the bounding box 714 or 724 may be set, and the update condition may be satisfied when the difference is less than the threshold. In this example, a greater difference between the target box 712 or 722 and the bounding box 714 or 724 may indicate a greater change in the shape of the target object. Such a difference between the boxes may indicate a distance therebetween, and be determined by comparing respective reference points (e.g., centers) of the boxes.

Also, a threshold of the confidence level of the bounding box 714 or 724 may be set, and the update condition may be satisfied when the confidence level is greater than the threshold. The confidence level of the bounding box 714 or 724 may be determined during similarity calculation and/or bounding box regression. The confidence level may indicate a probability of the bounding box 714 or 724 corresponding to the target object. In this example, a higher confidence level may indicate a smaller change in the shape of the target object.

The object tracking apparatus may set the update condition based on at least one of the elapsed time, the difference between the target box 712 or 722 and the bounding box 714 or 724, or the confidence level of the bounding box 714 or 724. When the set update condition is all satisfied, the object tracking apparatus may perform the template update. For example, a first threshold of the difference between the target box 712 or 722 and the bounding box 714 or 724 and a second threshold of the confidence level of the bounding box 714 or 724 may be set as the update condition.

In the case of the first image frame set 710, the difference between the first target box 712 and the first bounding box 714 may be less than the first threshold, and the confidence level of the first bounding box 714 may be greater than the second threshold. In this case, the object tracking apparatus may update the first template image 711 based on the first search image 713. In the case of the second image set 720, the difference between the second target box 722 and the second bounding box 724 may be greater than the first threshold value and the confidence level of the second bounding box 724 may be less than the second threshold. In this case, the object tracking apparatus may not update the second template image 721.

In the case of the first image frame set 710, to update the first template image 711, the object tracking apparatus may determine a new template corresponding to the first search image 713, and generate an updated template 730 through a weighted operation that is based on the previous template corresponding to the template image 711 and the new template. Each of the previous template, the new template, and the updated template 730 may correspond to a feature map. The weighted operation may correspond to a weighted sum, and a high weight may be assigned to the previous template for a stable update.

Figure 8:
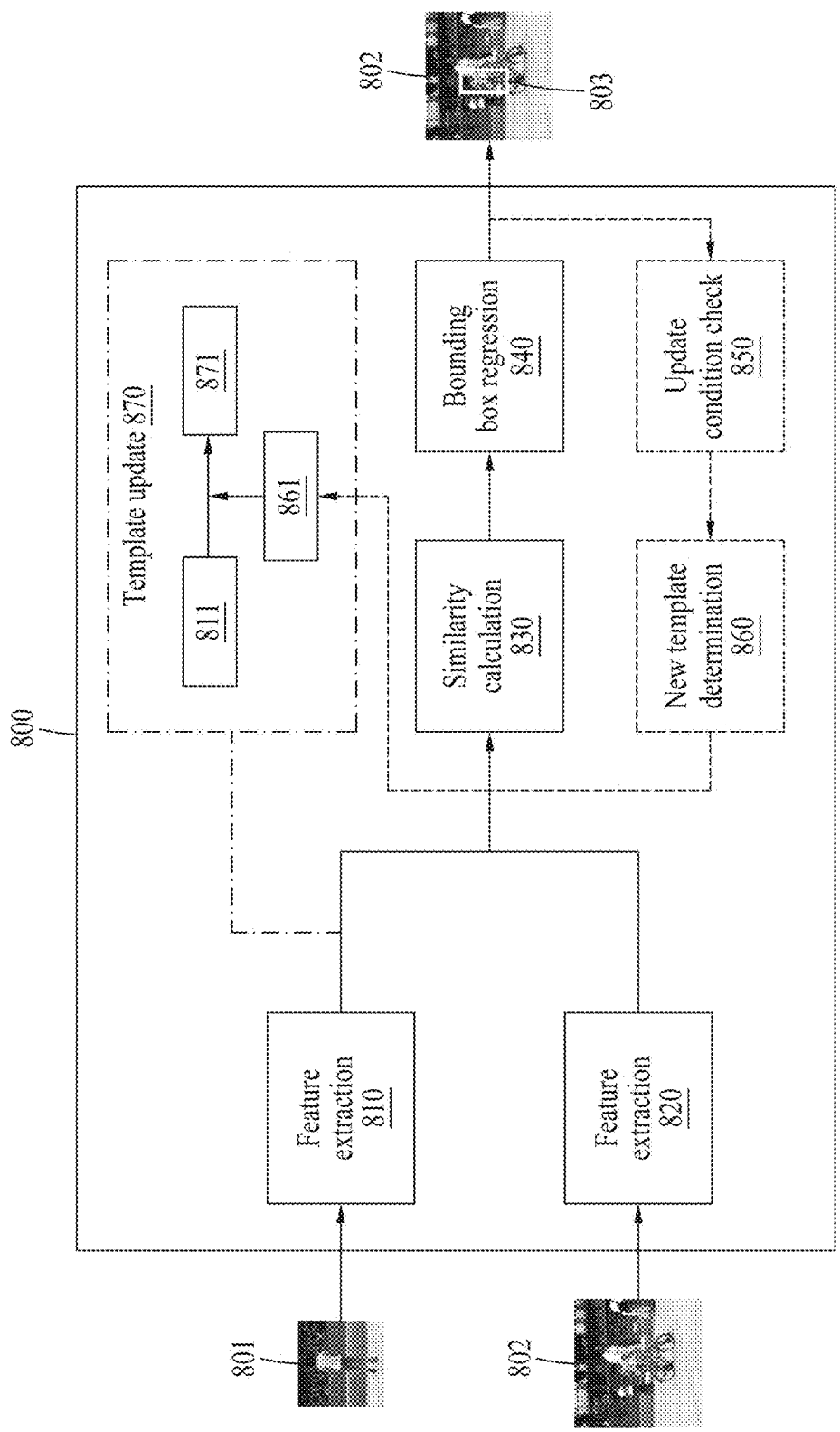
FIG. 8 illustrates an example of object tracking based on a template update.

FIG. 8 illustrates an example of object tracking based on a template update. Referring to FIG. 8, an object tracking operation 800 may include feature extraction 810 and 820, similarity calculation 830, bounding box regression 840, update condition check 850, new template determination 860, and template update 870. An object tracking apparatus may extract a template feature map from a template image 801 and extract a search feature map from a search image 802, using a feature extraction model. The object tracking apparatus may perform the similarity calculation 830 and the bounding box regression 840 based on the template feature map and the search feature map, and determine a bounding box 803 in the search image 802.

The object tracking apparatus may perform the update condition check 850, the new template determination 860, and the template update 870 based on a bounding box 803. The update condition check 850, the new template determination 860, and the template update 870 may correspond to post-processing of the search image 802. The object tracking apparatus may check an update condition associated with at least one of an elapsed time, a difference between a target box and the bounding box 803, or a confidence level of the bounding box 803. When the update condition is satisfied, the object tracking apparatus may determine a new template 861 based on the search image 802. The object tracking apparatus may determine, to be the new template 861, partial feature data corresponding to the template image 801 and/or the template feature map in the search feature map.

The object tracking apparatus may determine an updated template 871 based on a weighted operation between a previous template 811 corresponding to the template image 801 and the new template 861 corresponding to the search image 802. Each of the previous template 811, the new template 861, and the updated template 871 may correspond to a feature map, and the weighted operation may correspond to a weighted sum. For example, weights, for example, 9:1, may be assigned to the previous template 811 and the new template 861, respectively. As the higher weight is assigned to the previous template 811, a tracking stability may be maintained.

Figure 9:
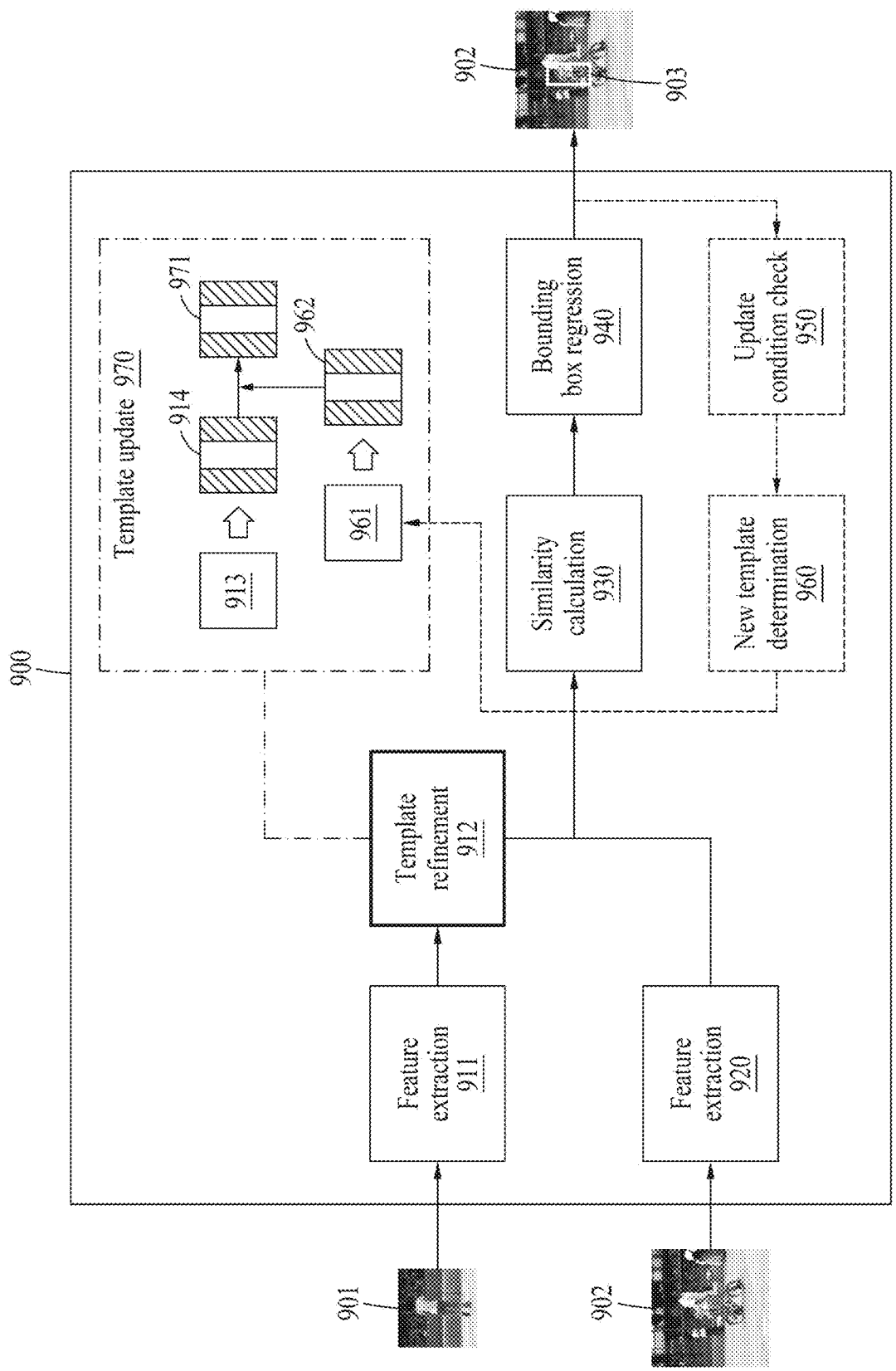
FIG. 9 illustrates an example of object tracking based on a template refinement and a template update.

FIG. 9 illustrates an example of object tracking based on a template refinement and a template update. Referring to FIG. 9, an object tracking operation 900 may include feature extraction 911 and 920, template refinement 912, similarity calculation 930, bounding box regression 940, update condition check 950, new template determination 960, and template update 970. The object tracking operation 900 to be described with reference to FIG. 9 may further include the template refinement 912, compared to the object tracking operation 800 described above with reference to FIG. 8. A template image 901 may be of an unbalanced type, and thus an object tracking apparatus may generate a refined template 914 by applying a suppressed region to a template 913. In such a case, a new template 961 may need to be refined for the template update 970. Thus, the object tracking apparatus may generate a newly refined template 962 by applying the suppressed region to the new template 961.

For example, when an update condition is satisfied, the object tracking apparatus may determine, to be the new template 961, partial feature data corresponding to the template image 901 and/or a template feature map in a search feature map. In an example, the object tracking apparatus may determine a template region corresponding to the template feature map in the search feature map and suppress an influence of feature data corresponding to a suppressed region in the template region, to generate a new feature map. For example, the object tracking apparatus may generate the newly refined template 962 by applying, to the new template 961, the suppressed region of the template image 901 or a new suppressed region that is based on a type of the bounding box 903. The object tracking apparatus may determine a updated template 971 based on a weighted operation between the previously refined template 914 and the newly refined template 962. Each of the templates 913, 914, 961, 962, and 971 may correspond to a feature map. The weighted operation may correspond to a weighted sum, and a high weight may be assigned to the previously refined template 914. For a more detailed description of the object tracking operation 900, reference may be made to what is described above with reference to FIGS. 6 and 8.

Figure 10:
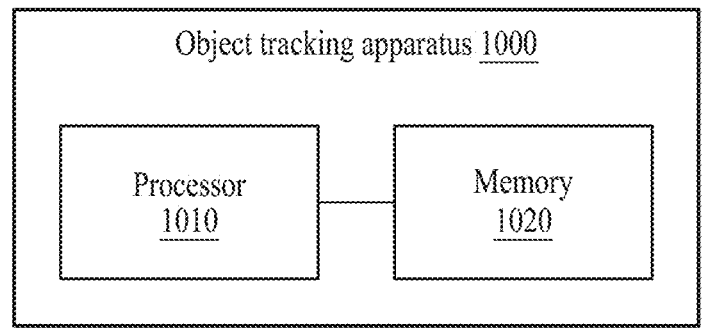
FIG. 10 illustrates an example of an object tacking apparatus.

FIG. 10 illustrates an example of an object tacking apparatus. Referring to FIG. 10, an object tracking apparatus 1000 may include a processor 1010 (e.g., one or more processors) and a memory 1020 (e.g., one or more memories). The memory 1020 may be connected to the processor 1010, and store instructions executable by the processor 1010, and data to be processed by the processor 1010 or data processed by the processor 1010. The memory 1020 may include, for example, a non-transitory computer-readable medium, for example, a high-speed random-access memory (RAM) and/or nonvolatile computer-readable storage medium (e.g., at least one disk storage device and flash memory device, and/or other nonvolatile solid-state memory devices).

The processor 1010 may execute instructions to perform the operations described with reference to FIGS. 1 through 9, 11, and 12. In an example, the processor 1010 may set a suppressed region in a template image based on a shape of a target box of the template image, refine a template feature map of the template image by suppressing an influence of feature data corresponding to the suppressed region in the template feature map, and determine a bounding box corresponding to the target box in a search image based on the refined template feature map. For a more detailed description of the object tracking apparatus 1000, reference may be made to what is described herein with reference to FIGS. 1 through 9, 11, and 12.

Figure 11:
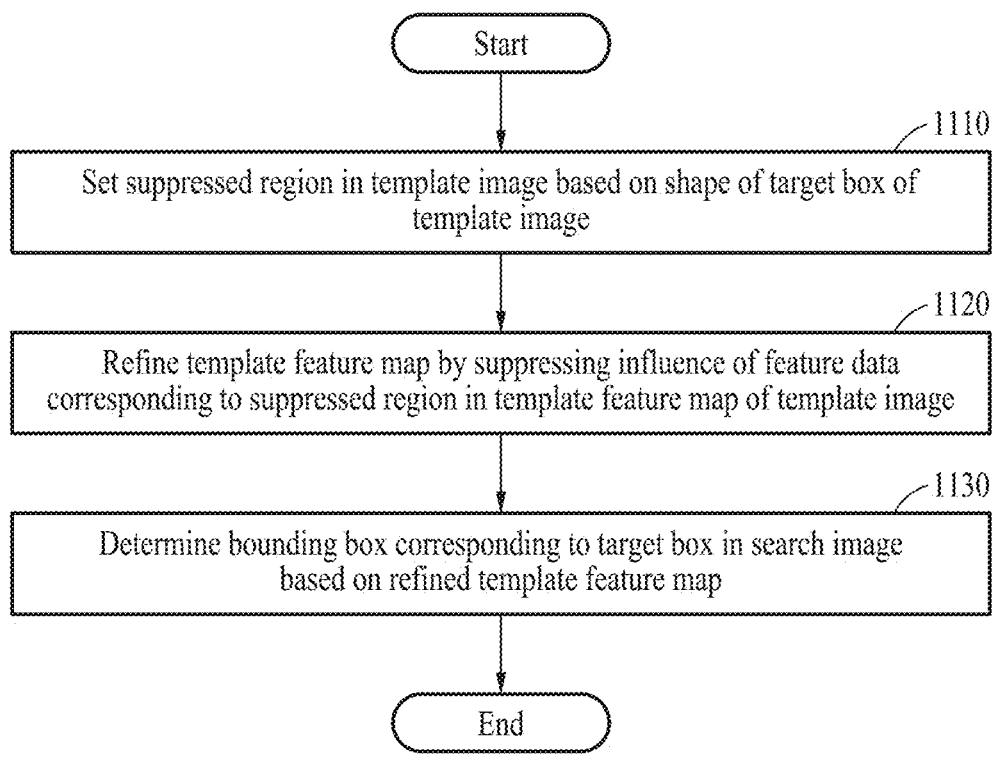
FIG. 11 illustrates an example of an object tracking method.

FIG. 11 illustrates an example of an object tracking method. Referring to FIG. 11, an object tracking apparatus may set a suppressed region in a template image based on a shape of a target box of the template imager in operation 1110, refine a template feature map of the template image by suppressing an influence of feature data corresponding to the suppressed region in the template feature map in operation 1120, and determine a bounding box corresponding to the target box in a search image based on the refined template feature map in operation 1130. For a more detailed description of the object tracking method, reference may be made to what is described herein with reference to FIGS. 1 through 10, and 12.

Figure 12:
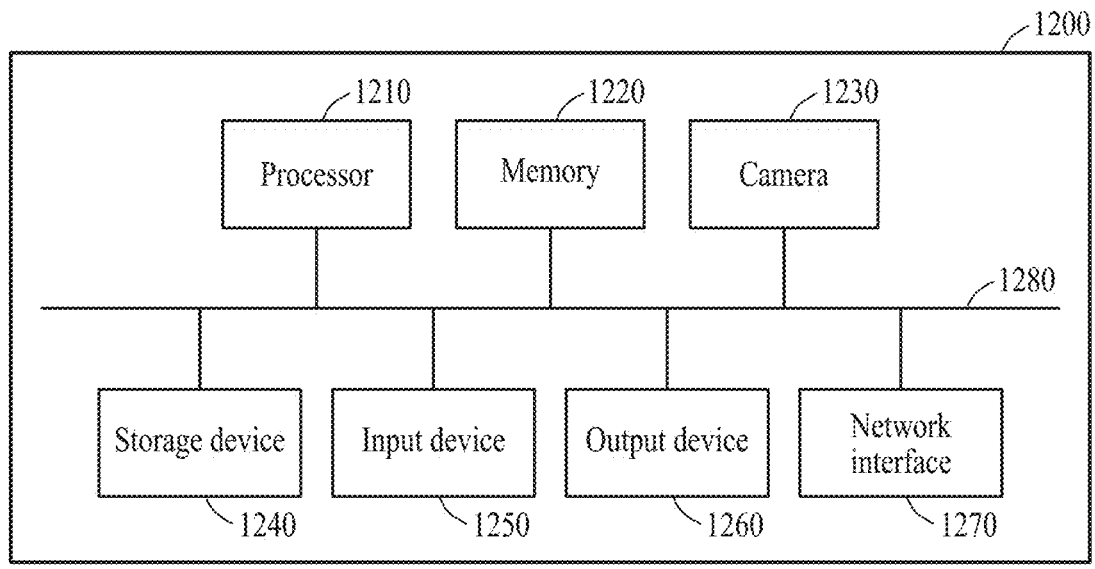
FIG. 12 illustrates an example of an electronic apparatus.

FIG. 12 illustrates an example of an electronic apparatus. Referring to FIG. 12, an electronic apparatus 1200 may include a processor 1210 (e.g., one or more processors), a memory 1220 (e.g., one or more memories), a camera 1230, a storage device 1240, an input device 1250, an output device 1260, and a network interface 1270, which may communicate with one another through a communication bus 1280. For example, the electronic apparatus 1200 may be provided as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), a smart appliance (e.g., a television (TV), a smart TV, a smart refrigerator, a smart washing machine, etc.), a security device (e.g., a closed-circuit TV (CCTV)), a means of transportation (e.g., an autonomous vehicle, a smart vehicle, a drone, etc.), and/or the like. The electronic apparatus 1200 may be or include, structurally and/or functionally, the object tracking apparatus 100 of FIG. 1 and/or the object tracking apparatus 1000 of FIG. 10.

The processor 1210 may execute functions and instructions to be executed in the electronic apparatus 1200. For example, the processor 1210 may process instructions stored in the memory 1220 or the storage device 1240. The processor 1210 may also perform the operations described above with reference to FIGS. 1 through 11. The memory 1220 may include a computer-readable storage medium or device. The memory 1220 may store instructions to be executed by the processor 1210 and store related information during the execution of software and/or application by the electronic apparatus 1200.

The camera 1230 may capture a still image and/or a moving image (or a video). For example, the camera 1230 may generate at least one of a template image or a search image. The storage device 1240 may include a computer-readable storage medium or device. The storage device 1240 may store a greater amount of information than the memory 1220 and store the information for a long period of time. The storage device 1240 may include, for example, a magnetic hard disk, an optical disc, a flash memory, a floppy disc, or other types of nonvolatile memory known in the relevant technical field.

The input device 1250 may receive an input from a user through a traditional input method using a keyboard and a mouse, or through a new input method using a touch input, a voice input, and an image input. The input device 1250 may include, for example, a keyboard, a mouse, a touchscreen, a microphone, or other devices that detect an input from a user and transfer the detected input to the electronic apparatus 1200. The output device 1260 may provide an output of the electronic apparatus 1200 to a user through a visual, auditory, or tactile channel. The output device 1260 may include, for example, a display, a touchscreen, a speaker, a vibration generator, or other devices that provide an output of the electronic apparatus 1200 to a user. The network interface 1270 may communicate with an external device through a wired or wireless network.

The object tracking apparatuses, processors, memories, electronic apparatuses, cameras, storage devices, input devices, output devices, network interfaces, communication buses, object tracking apparatus 100, object tracking apparatus 1000, processor 1010, memory 1020, electronic apparatus 1200, processor 1210, memory 1220, camera 1230, storage device 1240, input device 1250, output device 1260, network interface 1270, communication bus 1280, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented object tracking method, comprising:
    setting a suppressed region in a template image based on a shape of a target box of the template image;
    refining a template feature map of the template image by suppressing an influence of feature data corresponding to the suppressed region in the template feature map; and
    tracking an object by determining a bounding box corresponding to the target box in a search image based on the refined template feature map.

2. The method of 1, wherein the suppressed region corresponds to an outer region in the template image.

3. The method of claim 1, comprising:
    comparing a width and a height of the target box; and determining the shape of the target box to be either one of a first type that is long in a direction of the width and a second type that is long in a direction of the height based on a result of the comparing.

4. The method of claim 3, wherein the setting of the suppressed region comprises:
in response to the target box being of the first type, setting the suppressed region in an outer side in the template image in the direction of the height; and
in response to the target box being of the second type, setting the suppressed region in an outer side in the template image in the direction of the width.

5. The method of claim 1, wherein the refining of the template feature map comprises suppressing the influence of the feature data by applying, to the feature data, an average feature value that is based on the template feature map.

6. The method of claim 1, further comprising updating the refined template feature map based on either one or both of:
a difference between the target box and the bounding box; and
a confidence level of the bounding box.

7. The method of claim 6, wherein the updating of the refined template feature map comprises updating the refined template feature map in response to the difference being less than a first threshold and the confidence level being greater than a second threshold.

8. The method of claim 6, wherein the updating of the refined template feature map comprises:
determining a new feature map based on a search feature map of the search image; and
updating the refined template feature map by determining a weighted sum of the template feature map and the new feature map.

9. The method of claim 8, wherein the determining of the new feature map comprises:
determining a template region corresponding to the template image in the search feature map; and
determining the new feature map by suppressing an influence of feature data corresponding to the suppressed region in the template region.

10. The method of claim 1, further comprising:
extracting the template feature map from the template image using a feature extraction model; and
extracting a search feature map from the search image using the feature extraction model.

11. The method of claim 10, wherein the determining of the bounding box comprises determining the bounding box based on a result of comparing the refined template feature map and the search feature map.

12. A non-transitory computer-readable storage medium storing instructions that, when executed by a processor, configure the processor to perform the method of claim 1.

13. An object tracking apparatus, comprising:
a processor configured to:
set a suppressed region in a template image based on a shape of a target box of the template image;
refine a template feature map of the template image by suppressing an influence of feature data corresponding to the suppressed region in the template feature map; and
track an object by determining a bounding box corresponding to the target box in a search image based on the refined template feature map.

14. The apparatus of claim 13, wherein the processor is configured to:
compare a width and a height of the target box; and
determine the shape of the target box to be either one of a first type that is long in a direction of the width and a second type that is long in a direction of the height based on a result of the comparing.

15. The apparatus of claim 14, wherein, for the setting of the suppressed region, the processor is configured to:
in response to the target box being of the first type, set the suppressed region in an outer side in the template image in the direction of the height; and
in response to the target box being of the second type, set the suppressed region in an outer side in the template image in the direction of the width.

16. The apparatus of claim 13, wherein, for the refining of the template feature map, the processor is configured to suppress the influence of the feature data by applying, to the feature data, an average feature value that is based on the template feature map.

17. The apparatus of claim 13, wherein the processor is configured to:
determine a new feature map based on a search feature map of the search image; and
update the refined template feature map by obtaining a weighted sum of the template feature map and the new feature map.

18. The apparatus of claim 17, wherein, for the determining of the new feature map, the processor is configured to:
determine a template region corresponding to the template image in the search feature map; and
determine the new feature map by suppressing an influence of feature data corresponding to the suppressed region in the template region.

19. The apparatus of claim 13, further comprising a memory storing instructions that, when executed by the processor, configure the processor to perform the setting of the suppressed region, the refining of the template feature map, and the determining of the bounding box.

20. The apparatus of claim 13, wherein the apparatus is an electronic apparatus comprising a camera configured to generate the template image and the search image.

21. An electronic apparatus, comprising:
a camera configured to generate either one or both of a template image and a search image; and
a processor configured to
set a suppressed region in the template image based on a shape of a target box of the template image,
refine a template feature map of the template image by suppressing an influence of feature data corresponding to the suppressed region in the template feature map, and
track an object by determining a bounding box corresponding to the target box in the search image based on the refined template feature map.

22. The apparatus of claim 21, wherein the processor is configured to:
determine the shape of the target box to be either one of a first type that is long in a direction of a width of the target box and a second type that is long in a direction of a height of the target box based on a result of comparing the width and the height; and
for the setting of the suppressed region,
in response to the target box being of the first type, set the suppressed region in an outer side in the template image in the direction of the height; and
in response to the target box being of the second type, set the suppressed region in an outer side in the template image in the direction of the width.

23. A processor-implemented object tracking method, comprising:
- setting a suppressed region in a template image based on a shape of a target box of the template image;
- replacing, in a template feature map of the template image, feature data corresponding to the suppressed region;
- tracking an object by determining a bounding box corresponding to the target box in a search image based on the template feature map including the replaced feature data.

24. The method of claim 23, wherein the setting of the suppressed region is based on an orientation of a length of the target box.

25. The method of claim 23, wherein the replacing comprises replacing the feature data with either one of:
- an average feature value of entire feature data of the template feature map; and
- an average feature value of partial feature data of the template feature map corresponding to the target box.

26. The method of claim 23, wherein the template image includes a frame in successive image frames and the search image includes a subsequent frame in the successive image frames.

* * * * *